US012135862B2

(12) United States Patent
Goodrich et al.

(10) Patent No.: US 12,135,862 B2
(45) Date of Patent: *Nov. 5, 2024

(54) MEDIA CONTENT PLAYER ON AN EYEWEAR DEVICE

(71) Applicant: Snap Inc., Santa Monica, CA (US)

(72) Inventors: Kyle Goodrich, Venice, CA (US); Andrew James McPhee, Culver City, CA (US); Daniel Moreno, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,286

(22) Filed: Aug. 25, 2023

(65) Prior Publication Data

US 2023/0400965 A1    Dec. 14, 2023

Related U.S. Application Data

(63) Continuation of application No. 17/410,814, filed on Aug. 24, 2021, now Pat. No. 11,782,577.

(Continued)

(51) Int. Cl.
*G06F 3/0482* (2013.01)
*G06F 3/04847* (2022.01)
*G06F 3/0488* (2022.01)

(52) U.S. Cl.
CPC ........ *G06F 3/0482* (2013.01); *G06F 3/04847* (2013.01); *G06F 3/0488* (2013.01); *G06F 2203/04808* (2013.01)

(58) Field of Classification Search
None
See application file for complete search history.

(56) References Cited

U.S. PATENT DOCUMENTS 6,750,890 B1   6/2004  Sugimoto et al.
7,971,156 B2   6/2011  Albertson et al.
(Continued)

FOREIGN PATENT DOCUMENTS

CN   103049761 B   8/2016
CN   109885367 A   6/2019
(Continued)

OTHER PUBLICATIONS

"U.S. Appl. No. 17/301,284, Corrected Notice of Allowability mailed Jun. 2, 2022", 2 pgs.
(Continued)

*Primary Examiner* — William L Bashore
*Assistant Examiner* — Gabriel Mercado
(74) *Attorney, Agent, or Firm* — Schwegman Lundberg & Woessner, P.A.

(57) ABSTRACT

Systems and methods are provided for performing operations comprising: displaying, by one or more processors of an eyewear device, a plurality of media content control options; detecting, by a touch input interface of the eyewear device, a first touch input comprising a single finger touching the touch input interface; based on detecting the first touch input, causing a cursor to track the first touch input to navigate through the plurality of media content control options; based on detecting that the single finger has not been released from touching the touch input interface, displaying a second media content control option related to the first media content control option; and performing a selection associated with the second media content control option based on movement of the single finger along the touch input interface.

20 Claims, 11 Drawing Sheets

Related U.S. Application Data

(60) Provisional application No. 63/129,344, filed on Dec. 22, 2020.

(56) References Cited

U.S. PATENT DOCUMENTS

| | | |
|---|---|---|
| 7,996,793 B2 | 8/2011 | Latta et al. |
| 8,487,938 B2 | 7/2013 | Latta et al. |
| 8,856,691 B2 | 10/2014 | Geisner et al. |
| 8,971,572 B1 | 3/2015 | Yin et al. |
| 9,225,897 B1 | 12/2015 | Sehn et al. |
| 9,230,160 B1 | 1/2016 | Kanter |
| 9,270,811 B1 | 2/2016 | Atlas |
| 9,276,886 B1 | 3/2016 | Samaranayake |
| 9,292,082 B1 | 3/2016 | Patel et al. |
| 9,705,831 B2 | 7/2017 | Spiegel |
| 9,742,713 B2 | 8/2017 | Spiegel et al. |
| 9,977,523 B2 | 5/2018 | Kim et al. |
| 10,061,352 B1 | 8/2018 | Trail |
| 10,102,423 B2 | 10/2018 | Shaburov et al. |
| 10,261,595 B1 | 4/2019 | Kin |
| 10,281,992 B2 | 5/2019 | Cohen et al. |
| 10,284,508 B1 | 5/2019 | Allen et al. |
| 10,289,660 B2 | 5/2019 | Karunamuni et al. |
| 10,402,081 B1 | 9/2019 | Andersen et al. |
| 10,439,972 B1 | 10/2019 | Spiegel et al. |
| 10,503,264 B1 | 12/2019 | Blachly et al. |
| 10,509,466 B1 | 12/2019 | Miller et al. |
| 10,514,876 B2 | 12/2019 | Sehn |
| 10,515,484 B1 | 12/2019 | Lucas et al. |
| 10,551,937 B2 | 2/2020 | Dash |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,852,814 B1 | 12/2020 | Caron et al. |
| 10,957,059 B1 | 3/2021 | Katz et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,249,556 B1 | 2/2022 | Schwarz et al. |
| 11,307,747 B2 | 4/2022 | Dancie et al. |
| 11,340,756 B2 | 5/2022 | Faulkner et al. |
| 11,361,735 B1 | 6/2022 | Wang et al. |
| 11,455,078 B1 | 9/2022 | Goodrich et al. |
| 11,531,402 B1 | 12/2022 | Stolzenberg |
| 11,546,505 B2 | 1/2023 | Canberk |
| 11,782,577 B2 | 10/2023 | Goodrich et al. |
| 11,797,162 B2 | 10/2023 | Goodrich et al. |
| 11,847,302 B2 | 12/2023 | Goodrich et al. |
| 2003/0090524 A1 | 5/2003 | Segerberg et al. |
| 2003/0154300 A1 | 8/2003 | Mostafa |
| 2004/0203956 A1 | 10/2004 | Tsampalis |
| 2004/0233238 A1 | 11/2004 | Lahdesmaki |
| 2005/0076309 A1 | 4/2005 | Goldsmith |
| 2005/0108392 A1 | 5/2005 | Glasser et al. |
| 2005/0160451 A1 | 7/2005 | Batra et al. |
| 2005/0210410 A1 | 9/2005 | Ohwa |
| 2006/0001650 A1 | 1/2006 | Robbins et al. |
| 2007/0150830 A1 | 6/2007 | Ording et al. |
| 2008/0114850 A1 | 5/2008 | Skog et al. |
| 2009/0012788 A1 | 1/2009 | Gilbert et al. |
| 2010/0125811 A1 | 5/2010 | Moore et al. |
| 2010/0289740 A1 | 11/2010 | Kim et al. |
| 2011/0050562 A1 | 3/2011 | Schoen et al. |
| 2011/0109577 A1 | 5/2011 | Lee et al. |
| 2011/0292177 A1 | 12/2011 | Sakurai et al. |
| 2011/0301934 A1 | 12/2011 | Tardif |
| 2012/0144331 A1 | 6/2012 | Tolonen et al. |
| 2012/0236031 A1 | 9/2012 | Haddick et al. |
| 2012/0249416 A1 | 10/2012 | Maciocci et al. |
| 2013/0016070 A1 | 1/2013 | Starner et al. |
| 2013/0088455 A1 | 4/2013 | Jeong |
| 2013/0254695 A1 | 9/2013 | Lambourne et al. |
| 2014/0053086 A1 | 2/2014 | Kim et al. |
| 2014/0055343 A1 | 2/2014 | Kim |
| 2014/0115114 A1 | 4/2014 | Garmark et al. |
| 2014/0171036 A1 | 6/2014 | Simmons |
| 2014/0201666 A1 | 7/2014 | Bedikian et al. |
| 2014/0267189 A1 | 9/2014 | Moll et al. |
| 2014/0289676 A1 | 9/2014 | Yoritate et al. |
| 2014/0375683 A1 | 12/2014 | Salter et al. |
| 2015/0009124 A1 | 1/2015 | Antoniac |
| 2015/0078586 A1 | 3/2015 | Ang et al. |
| 2015/0085058 A1 | 3/2015 | Zhang et al. |
| 2015/0089451 A1* | 3/2015 | Jin ............... G06F 3/0482 715/810 |
| 2015/0103021 A1 | 4/2015 | Lim et al. |
| 2015/0120293 A1 | 4/2015 | Wohlert et al. |
| 2015/0186002 A1 | 7/2015 | Suzuki et al. |
| 2015/0187357 A1 | 7/2015 | Xia et al. |
| 2015/0271120 A1 | 9/2015 | Langholz |
| 2015/0287403 A1 | 10/2015 | Holzer Zaslansky et al. |
| 2015/0309316 A1 | 10/2015 | Osterhout et al. |
| 2015/0324087 A1* | 11/2015 | Gregory ............ G06F 3/013 345/174 |
| 2015/0324645 A1 | 11/2015 | Jang et al. |
| 2015/0370320 A1 | 12/2015 | Connor |
| 2016/0092035 A1 | 3/2016 | Crocker et al. |
| 2016/0113550 A1 | 4/2016 | Martin |
| 2016/0162531 A1 | 6/2016 | Beattie, Jr. et al. |
| 2016/0189315 A1 | 6/2016 | Anania et al. |
| 2016/0259517 A1 | 9/2016 | Butcher et al. |
| 2016/0320853 A1 | 11/2016 | Lien et al. |
| 2017/0046058 A1 | 2/2017 | Karunamuni et al. |
| 2017/0090747 A1 | 3/2017 | Dash |
| 2017/0097687 A1 | 4/2017 | Pinault et al. |
| 2017/0111723 A1 | 4/2017 | Boesen |
| 2017/0123487 A1 | 5/2017 | Hazra et al. |
| 2017/0195736 A1 | 7/2017 | Chai et al. |
| 2017/0195739 A1 | 7/2017 | Wessel |
| 2017/0228130 A1 | 8/2017 | Palmaro |
| 2017/0236197 A1 | 8/2017 | Acken et al. |
| 2017/0277684 A1 | 9/2017 | Dharmarajan Mary |
| 2017/0277685 A1 | 9/2017 | Takumi |
| 2017/0287225 A1 | 10/2017 | Powderly et al. |
| 2017/0351910 A1 | 12/2017 | Elwazer et al. |
| 2018/0004392 A1 | 1/2018 | Yang et al. |
| 2018/0005429 A1 | 1/2018 | Osman et al. |
| 2018/0046245 A1 | 2/2018 | Schwarz et al. |
| 2018/0062691 A1 | 3/2018 | Barnett, Jr. |
| 2018/0067914 A1 | 3/2018 | Chen et al. |
| 2018/0075658 A1 | 3/2018 | Lanier et al. |
| 2018/0101986 A1 | 4/2018 | Burns et al. |
| 2018/0107276 A1 | 4/2018 | Heubel et al. |
| 2018/0158370 A1 | 6/2018 | Pryor |
| 2018/0321826 A1 | 11/2018 | Bereza et al. |
| 2018/0329209 A1 | 11/2018 | Nattukallingal |
| 2018/0335930 A1 | 11/2018 | Scapel et al. |
| 2018/0343023 A1 | 11/2018 | Park et al. |
| 2018/0349690 A1 | 12/2018 | Rhee et al. |
| 2019/0019508 A1 | 1/2019 | Rochford et al. |
| 2019/0052587 A1 | 2/2019 | Andreou et al. |
| 2019/0114802 A1 | 4/2019 | Lazarow |
| 2019/0146219 A1 | 5/2019 | Rodriguez, II |
| 2019/0172262 A1 | 6/2019 | Mchugh et al. |
| 2019/0179405 A1 | 6/2019 | Sun et al. |
| 2019/0187765 A1 | 6/2019 | Ashwood et al. |
| 2019/0188918 A1 | 6/2019 | Brewer et al. |
| 2019/0205010 A1 | 7/2019 | Fujii et al. |
| 2019/0266405 A1 | 8/2019 | Chang |
| 2019/0307982 A1 | 10/2019 | Brodsky |
| 2019/0310757 A1 | 10/2019 | Lee et al. |

(56) References Cited

U.S. PATENT DOCUMENTS

| | | | |
|---|---|---|---|
| 2019/0340799 A1 | 11/2019 | Dryer et al. | |
| 2019/0342507 A1 | 11/2019 | Dye et al. | |
| 2019/0362557 A1 | 11/2019 | Lacey et al. | |
| 2019/0369839 A1 | 12/2019 | Yang et al. | |
| 2020/0034033 A1 | 1/2020 | Chaudhri et al. | |
| 2020/0036830 A1 | 1/2020 | Hatanaka et al. | |
| 2020/0042095 A1 | 2/2020 | Ang et al. | |
| 2020/0104039 A1 | 4/2020 | Robertson et al. | |
| 2020/0142497 A1 | 5/2020 | Zhu et al. | |
| 2020/0201514 A1 | 6/2020 | Murphy et al. | |
| 2020/0226814 A1 | 7/2020 | Tang et al. | |
| 2020/0226835 A1 | 7/2020 | Farchy et al. | |
| 2020/0279104 A1 | 9/2020 | Andersen et al. | |
| 2020/0293155 A1 | 9/2020 | Shin | |
| 2020/0301500 A1 | 9/2020 | Wilde et al. | |
| 2020/0301575 A1* | 9/2020 | Lindholm | H04N 21/42224 |
| 2020/0348767 A1 | 11/2020 | Araújo et al. | |
| 2020/0387228 A1 | 12/2020 | Ravasz et al. | |
| 2020/0387286 A1 | 12/2020 | Ravasz et al. | |
| 2021/0004146 A1 | 1/2021 | Linville et al. | |
| 2021/0011612 A1 | 1/2021 | Dancie et al. | |
| 2021/0074016 A1 | 3/2021 | Li et al. | |
| 2021/0157412 A1 | 5/2021 | Katz | |
| 2021/0166732 A1 | 6/2021 | Shaburova et al. | |
| 2021/0174034 A1 | 6/2021 | Retek et al. | |
| 2021/0200324 A1 | 7/2021 | Doganis | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0334733 A1 | 10/2021 | Peters | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2021/0405772 A1 | 12/2021 | Canberk et al. | |
| 2022/0188539 A1 | 6/2022 | Chan et al. | |
| 2022/0197027 A1 | 6/2022 | Goodrich et al. | |
| 2022/0197393 A1 | 6/2022 | Goodrich et al. | |
| 2022/0197446 A1 | 6/2022 | Goodrich et al. | |
| 2022/0197485 A1 | 6/2022 | Goodrich et al. | |
| 2022/0198603 A1 | 6/2022 | Goodrich et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2022/0382377 A1 | 12/2022 | Hosseinkhani Loorak et al. | |
| 2022/0397989 A1 | 12/2022 | Catalano et al. | |
| 2023/0055634 A1 | 2/2023 | Goodrich et al. | |
| 2023/0067305 A1 | 3/2023 | Assa et al. | |
| 2023/0297161 A1 | 9/2023 | Moll | |
| 2023/0300292 A1 | 9/2023 | Barbosa Da Silva et al. | |
| 2024/0012549 A1 | 1/2024 | Goodrich et al. | |
| 2024/0061552 A1 | 2/2024 | Goodrich et al. | |

FOREIGN PATENT DOCUMENTS

| | | |
|---|---|---|
| CN | 116635771 A | 8/2023 |
| CN | 116670632 A | 8/2023 |
| CN | 116685938 A | 9/2023 |
| CN | 116724286 A | 9/2023 |
| CN | 116802590 A | 9/2023 |
| EP | 3707693 A1 | 9/2020 |
| EP | 4172726 A1 | 5/2023 |
| EP | 4172730 A1 | 5/2023 |
| JP | 2018032329 A | 3/2018 |
| KR | 20150051769 A | 5/2015 |
| KR | 20220158824 A | 12/2022 |
| WO | WO-2009137419 A2 | 11/2009 |
| WO | WO-2015192117 A1 | 12/2015 |
| WO | WO-2016168591 A1 | 10/2016 |
| WO | WO-2019094618 A1 | 5/2019 |
| WO | WO-2021206578 A1 | 10/2021 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022067254 A1 | 3/2022 |
| WO | WO-2022060549 A3 | 4/2022 |
| WO | WO-2022131784 A1 | 6/2022 |
| WO | WO-2022132381 A1 | 6/2022 |
| WO | WO-2022140113 A1 | 6/2022 |
| WO | WO-2022140117 A1 | 6/2022 |
| WO | WO-2022140129 A1 | 6/2022 |
| WO | WO-2022140734 A1 | 6/2022 |
| WO | WO-2022140739 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023177661 A1 | 9/2023 |

OTHER PUBLICATIONS

"U.S. Appl. No. 17/301,284, Corrected Notice of Allowability mailed Aug. 23, 2022", 2 pgs.

"U.S. Appl. No. 17/301,284, Non Final Office Action mailed Dec. 14, 2021", 27 pgs.

"U.S. Appl. No. 17/301,284, Notice of Allowance mailed May 20, 2022", 8 pgs.

"U.S. Appl. No. 17/301,284, Response filed Mar. 14, 2022 to Non Final Office Action mailed Dec. 14, 2021", 10 pgs.

"U.S. Appl. No. 17/410,787, Corrected Notice of Allowability mailed Jan. 11, 2023", 2 pgs.

"U.S. Appl. No. 17/410,787, Non Final Office Action mailed Aug. 17, 2022", 15 pgs.

"U.S. Appl. No. 17/410,787, Notice of Allowance mailed Dec. 29, 2022", 12 pgs.

"U.S. Appl. No. 17/410,787, Response filed Nov. 4, 2022 to Non Final Office Action mailed Aug. 17, 2022", 9 pgs.

"U.S. Appl. No. 17/410,814, Advisory Action mailed Apr. 17, 2023", 5 pgs.

"U.S. Appl. No. 17/410,814, Advisory Action mailed Aug. 30, 2022", 4 pgs.

"U.S. Appl. No. 17/410,814, Final Office Action mailed Feb. 8, 2023", 24 pgs.

"U.S. Appl. No. 17/410,814, Final Office Action mailed Jun. 7, 2022", 21 pgs.

"U.S. Appl. No. 17/410,814, Non Final Office Action mailed Jan. 12, 2022", 22 pgs.

"U.S. Appl. No. 17/410,814, Non Final Office Action mailed Oct. 3, 2022", 21 pgs.

"U.S. Appl. No. 17/410,814, Notice of Allowance mailed May 25, 2023", 11 pgs.

"U.S. Appl. No. 17/410,814, Response filed Mar. 30, 2022 to Non Final Office Action mailed Jan. 12, 2022", 13 pgs.

"U.S. Appl. No. 17/410,814, Response filed Apr. 6, 2023 to Final Office Action mailed Feb. 8, 2023", Response to Final Office Action, 13 pgs.

"U.S. Appl. No. 17/410,814, Response filed Apr. 19, 2023 to Advisory Action mailed Apr. 17, 2023", 13 pgs.

"U.S. Appl. No. 17/410,814, Response filed Aug. 5, 2022 to Final Office Action mailed Jun. 7, 2022", 11 pgs.

"U.S. Appl. No. 17/410,814, Response filed Dec. 30, 2022 to Non Final Office Action mailed Oct. 3, 2022", 11 pgs.

"U.S. Appl. No. 17/410,814, Supplemental Notice of Allowability mailed Jun. 29, 2023", 8 pgs.

"U.S. Appl. No. 17/445,767, Advisory Action mailed Mar. 17, 2023", 2 pgs.

"U.S. Appl. No. 17/445,767, Final Office Action mailed Feb. 9, 2023", 26 pgs.

"U.S. Appl. No. 17/445,767, Non Final Office Action mailed Sep. 9, 2022", 25 pgs.

"U.S. Appl. No. 17/445,767, Response filed Mar. 7, 2023 to Non Final Office Action mailed Sep. 9, 2022", 10 pgs.

(56) References Cited

OTHER PUBLICATIONS

"U.S. Appl. No. 17/445,767, Response filed Dec. 7, 2022 to Non Final Office Action mailed Sep. 9, 2022", 11 pgs.
"U.S. Appl. No. 17/445,772, Advisory Action mailed Feb. 10, 2023", 3 pgs.
"U.S. Appl. No. 17/445,772, Final Office Action mailed Dec. 1, 2022", 42 pgs.
"U.S. Appl. No. 17/445,772, Non Final Office Action mailed Mar. 10, 2023", 36 pgs.
"U.S. Appl. No. 17/445,772, Non Final Office Action mailed Jun. 17, 2022", 38 pgs.
"U.S. Appl. No. 17/445,772, Response filed Jan. 31, 2023 to Final Office Action mailed Dec. 1, 2022", 12 pgs.
"U.S. Appl. No. 17/445,772, Response filed Sep. 16, 2022 to Non Final Office Action mailed Jun. 17, 2022", 11 pgs.
"U.S. Appl. No. 17/445,774, Advisory Action mailed Mar. 9, 2023", 6 pgs.
"U.S. Appl. No. 17/445,774, Final Office Action mailed Dec. 22, 2022", 29 pgs.
"U.S. Appl. No. 17/445,774, Non Final Office Action mailed Jul. 13, 2022", 26 pgs.
"U.S. Appl. No. 17/445,774, Response filed Feb. 22, 2023 to Final Office Action mailed Dec. 22, 2022", 10 pgs.
"U.S. Appl. No. 17/445,774, Response filed Oct. 12, 2022 to Non Final Office Action mailed Jul. 13, 2022", 12 pgs.
"U.S. Appl. No. 17/821,741, Non Final Office Action mailed Mar. 8, 2023", 15 pgs.
"International Application Serial No. PCT/US2021/063307, International Search Report mailed May 12, 2022", 6 pgs.
"International Application Serial No. PCT/US2021/063307, Invitation to Pay Additional Fees mailed Mar. 21, 2022", 12 pgs.
"International Application Serial No. PCT/US2021/063307, Written Opinion mailed May 12, 2022", 10 pgs.
"International Application Serial No. PCT/US2021/063350, International Search Report mailed Apr. 5, 2022", 4 pgs.
"International Application Serial No. PCT/US2021/063350, Written Opinion mailed Apr. 5, 2022", 5 pgs.
"International Application Serial No. PCT/US2021/063553, International Search Report mailed Mar. 18, 2022", 4 pgs.
"International Application Serial No. PCT/US2021/063553, Written Opinion mailed Mar. 18, 2022", 8 pgs.
"International Application Serial No. PCT/US2021/072864, International Search Report mailed Mar. 29, 2022", 4 pgs.
"International Application Serial No. PCT/US2021/072864, Written Opinion mailed Mar. 29, 2022", 7 pgs.
"International Application Serial No. PCT/US2021/072959, International Search Report mailed Apr. 5, 2022", 5 pgs.
"International Application Serial No. PCT/US2021/072959, Written Opinion mailed Apr. 5, 2022", 7 pgs.
"Skype for Business User Guide", Information Services, Heriot-Watt University, UK, [Online] Retrieved from the Internet: <URL:https://www.hw.ac.uk/services/docs/is/skypeforbusinessuserguidev2.0.pdf>, [retrieved on Apr. 12, 2022], (2019), 16 pgs.
Wang, Wallace, "Mac OS X for Absolute Beginners", Apress, (2016), 507 pgs.
"U.S. Appl. No. 17/410,787, Advisory Action mailed Feb. 9, 2024", 4 pgs.
"U.S. Appl. No. 17/410,787, Final Office Action mailed Dec. 27, 2023", 17 pgs.
"U.S. Appl. No. 17/410,787, Non Final Office Action mailed May 20, 2024", 23 pgs.
"U.S. Appl. No. 17/410,787, Non Final Office Action mailed Aug. 29, 2023", 14 pgs.
"U.S. Appl. No. 17/410,787, Response filed Jan. 31, 2024 to Final Office Action mailed Dec. 27, 2023", 11 pgs.
"U.S. Appl. No. 17/410,787, Response filed Nov. 1, 2023 to Non Final Office Action mailed Aug. 29, 2023", 10 pgs.
"U.S. Appl. No. 17/410,814, 312 Amendment filed Aug. 25, 2023", 3 pgs.
"U.S. Appl. No. 17/445,767, Final Office Action mailed Sep. 13, 2023", 30 pgs.
"U.S. Appl. No. 17/445,767, Non Final Office Action mailed Jun. 1, 2023", 25 pgs.
"U.S. Appl. No. 17/445,767, Response filed Sep. 1, 2023 to Non Final Office Action mailed Jun. 1, 2023", 13 pgs.
"U.S. Appl. No. 17/445,772, Advisory Action mailed Nov. 17, 2023", 3 pgs.
"U.S. Appl. No. 17/445,772, Final Office Action mailed Sep. 22, 2023", 46 pgs.
"U.S. Appl. No. 17/445,772, Non Final Office Action mailed Jan. 10, 2024", 45 pgs.
"U.S. Appl. No. 17/445,772, Notice of Allowance mailed May 29, 2024", 15 pgs.
"U.S. Appl. No. 17/445,772, Response filed Mar. 26, 2024 to Non Final Office Action mailed Jan. 10, 2024", 14 pgs.
"U.S. Appl. No. 17/445,772, Response filed Jun. 9, 2023 to Non Final Office Action mailed Mar. 10, 2023", 14 pgs.
"U.S. Appl. No. 17/445,772, Response filed Nov. 8, 2023 to Final Office Action mailed Sep. 22, 2023", 13 pgs.
"U.S. Appl. No. 17/445,774, Corrected Notice of Allowability mailed Jul. 6, 2023", 2 pgs.
"U.S. Appl. No. 17/445,774, Notice of Allowance mailed Jun. 22, 2023", 20 pgs.
"U.S. Appl. No. 17/655,125, Final Office Action mailed Apr. 25, 2023", 21 pgs.
"U.S. Appl. No. 17/655,125, Final Office Action mailed Nov. 15, 2023", 23 pgs.
"U.S. Appl. No. 17/655,125, Non Final Office Action mailed Jul. 24, 2023", 22 pgs.
"U.S. Appl. No. 17/655,125, Non Final Office Action mailed Nov. 8, 2022", 20 pgs.
"U.S. Appl. No. 17/655,125, Response filed Feb. 8, 2023 to Non Final Office Action mailed Nov. 8, 2022", 12 pgs.
"U.S. Appl. No. 17/655,125, Response filed Jun. 29, 2023 to Final Office Action mailed Apr. 25, 2023", 11 pgs.
"U.S. Appl. No. 17/655,125, Response filed Oct. 24, 2023 to Non Final Office Action mailed Jul. 24, 2023", 11 pgs.
"U.S. Appl. No. 17/821,741, Corrected Notice of Allowability mailed Aug. 11, 2023", 2 pgs.
"U.S. Appl. No. 17/821,741, Notice of Allowance mailed Jul. 28, 2023", 8 pgs.
"U.S. Appl. No. 17/821,741, Response filed Jun. 8, 2023 to Non Final Office Action mailed Mar. 8, 2023", 12 pgs.
"International Application Serial No. PCT/US2021/063307, International Preliminary Report on Patentability mailed Jul. 6, 2023", 12 pgs.
"International Application Serial No. PCT/US2021/063350, International Preliminary Report on Patentability mailed Jul. 6, 2023", 7 pgs.
"International Application Serial No. PCT/US2021/063553, International Preliminary Report on Patentability mailed Jul. 6, 2023", 10 pgs.
"International Application Serial No. PCT/US2021/072864, International Preliminary Report on Patentability mailed Jul. 6, 2023", 9 pgs.
"International Application Serial No. PCT/US2021/072959, International Preliminary Report on Patentability mailed Jul. 6, 2023", 9 pgs.
"International Application Serial No. PCT/US2023/015179, International Search Report mailed Aug. 21, 2023", 4 pgs.
"International Application Serial No. PCT/US2023/015179, Written Opinion mailed Aug. 21, 2023", 4 pgs.
U.S. Appl. No. 18/499,753, filed Nov. 1, 2023, Spatial Navigation and Creation Interface.
U.S. Appl. No. 18/471,056, filed Sep. 20, 2023, 3D Painting on an Eyewear Device.
U.S. Appl. No. 18/436,580, filed Feb. 8, 2024, Maintaining AR/VR Content at a Re-Defined Position.
"U.S. Appl. No. 17/445,772, Corrected Notice of Allowability mailed Jun. 10, 2024", 3 pgs.

(56) References Cited

OTHER PUBLICATIONS

"U.S. Appl. No. 18/471,056, Non Final Office Action mailed Jun. 12, 2024", 20 pgs.

* cited by examiner

MEDIA CONTENT PLAYER ON AN EYEWEAR DEVICE

CROSS-REFERENCE TO RELATED APPLICATIONS

This application is a continuation of U.S. patent application Ser. No. 17/410,814, filed Aug. 24, 2021, which claims the benefit of priority to U.S. Provisional Application Ser. No. 63/129,344, filed Dec. 22, 2020, each of which is incorporated in its entirety by reference herein.

FIELD OF USE

This application relates to eyewear devices.

BACKGROUND

Some electronics-enabled eyewear devices, such as so-called smart glasses, allow users to interact with virtual content while a user is engaged in some activity. Users wear the eyewear devices and can view a real-world environment through the eyewear devices while interacting with virtual content that is displayed by the eyewear devices.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Typical smart glass platforms allow users to interact with various types of virtual content. Such platforms are configured to display the virtual content in the lenses of the smart glasses. Interactions with such virtual content is usually limited to single button selections or voice navigation because of the limited amount of user input interfaces that are available on the smart glasses. Specifically, such smart glasses can only include a single touch input interface. While such systems work well to generally allow users to interact with virtual content, such devices do not enable users to navigate through complex menu structures. This limits the amount of content a user can navigate through and the types of interactions the user can perform.

The disclosed embodiments improve the efficiency of using the electronic device by providing a system that leverages multiple types of user inputs to seamlessly and quickly navigate through a complex menu hierarchy to control content playback on an eyewear device. Specifically, according to the disclosed techniques, a plurality of media content control options are displayed by one or more processors of an eyewear device. The disclosed embodiments detect, by a touch input interface of the eyewear device, a first touch input comprising a single finger touching the touch input interface. The disclosed embodiments allow navigation via a cursor through the plurality of media content control options based on the first touch input to select a first media content control option of the plurality of media content control options and display a second media content control option related to the first media content control option in response to the first touch input. The disclosed embodiments perform a selection associated with the second media content control option based on detecting movement of the single finger along the touch input interface.

The disclosed embodiments increase the efficiencies of the electronic device by reducing the amount of pages of information and inputs needed to accomplish a task. The disclosed embodiments further increase the efficiency, appeal, and utility of electronic eyewear devices.

Networked Computing Environment

Figure 1:
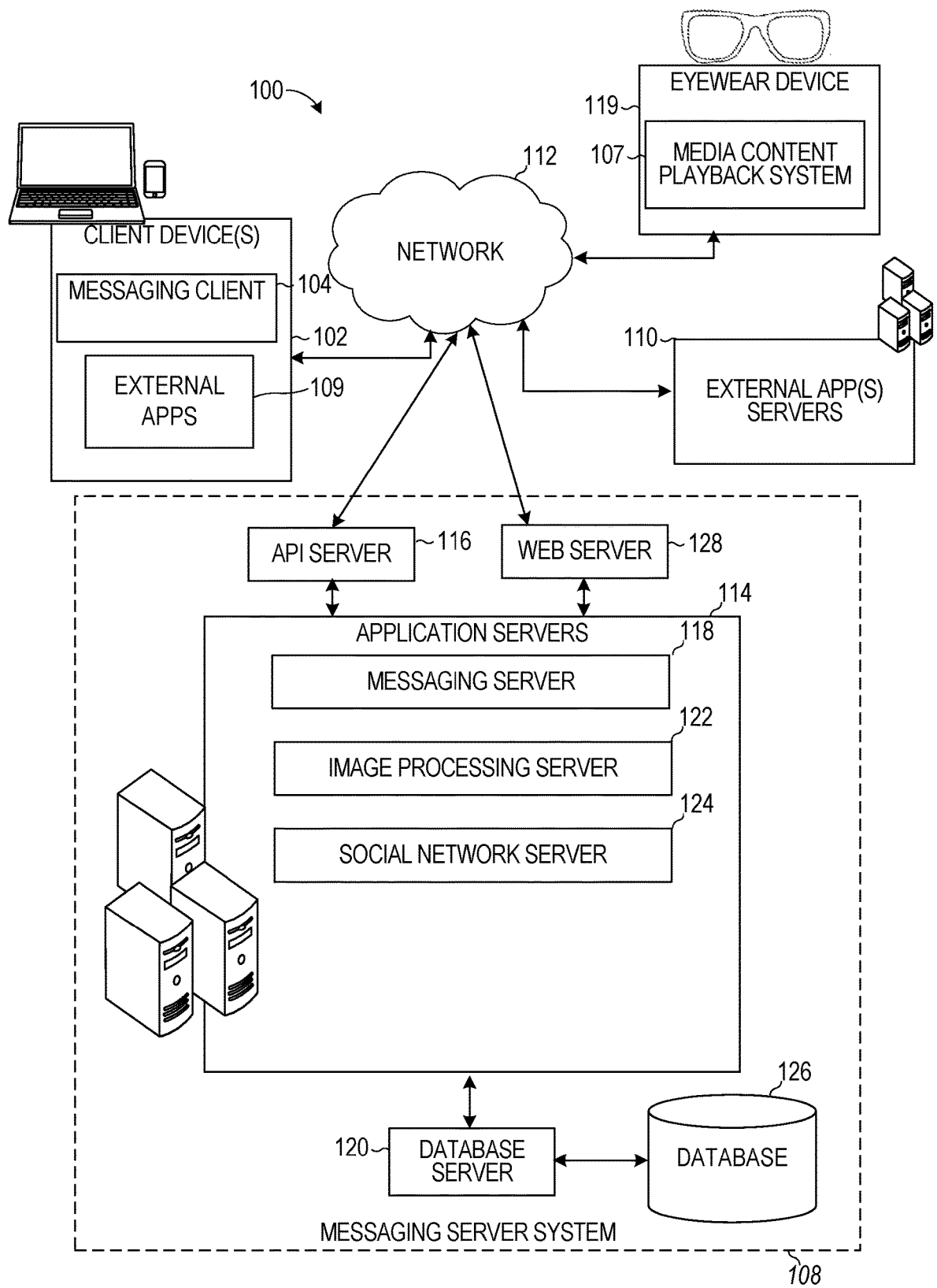
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs). The messaging system 100 includes an eyewear device 119, which hosts a media content playback system 107, among other applications. The eyewear device 119 is communicatively coupled to the client device 102 via the network 112 (which may include via a dedicated short-range communication path, such as a Bluetooth™ or WiFi direct connection).

The media content playback system 107 enables a user to navigate through a hierarchy of levels of a media content playback menu using various touch inputs. For example, the media content playback system 107 presents a first level of the hierarchy of levels of a media content playback menu on the lenses of the eyewear device 119. The first level of the media content playback menu includes a first set of options (e.g., a skip, fast-forward, pause, rewind, chapter select, scene select, series selection, volume control, episode selection, comment, and so forth). The media content playback system 107 detects a single or one finger touch on a touch input interface of the eyewear device 119. The single or one finger touch can be a press and hold operation which activates a display of a cursor on the lenses of the eyewear device 119. The media content playback system 107 can detect that the finger slides along the touch input interface. In response, the media content playback system 107 moves the cursor to highlight a first option of the first set of options of the first level. In response to the media content playback system 107 detecting that the finger no longer makes contact with the touch input interface, or in response to the cursor remaining at a particular location highlighting the first option for a specified threshold period of time (e.g., 3 seconds), the media content playback system 107 displays a second level of the media content playback menu hierarchy of levels. The second level of the hierarchy of levels includes a set of options corresponding to the first option. The second level may be displayed in replacement of the first level in which case the first set of options are removed from the display and the second set of options are displayed at the same or substantially the same location as the first set of options. In some cases, the second set of options are presented above or below or adjacent to the first set of options, such that both the first and second sets of options are displayed simultaneously. Any touch input received from the user when the second set of options are displayed is associated with and navigates through the second set of options.

For example, the first level of the media content playback menu can include a first set of options that each adjusts playback in a different way. In one example, the first set of options includes any one or more of an option to select a series, an option to adjust volume, an option to control a transport bar, or an option to adjust frame skipping operations. The second level can include a second set of options corresponding to each one of the first sets of options.

As an example, if the option to select a series from the first level is selected by input consisting of a user dragging a single finger along the touch input interface of the eyewear device 119 until the cursor highlights the series selection option and then releasing the finger from the touch input interface, the media content playback system 107 displays a second set of options in the second level that includes identifiers of various series that the user may be interested in. Alternatively, the second set of options are displayed before the media content playback system 107 detects the release of the finger from the touch input interface and in response to determining that the series selection option has remained highlighted for a specified threshold period of time (e.g., 3 seconds). The media content playback system 107 can detect that the single finger has been dragged again along the touch input interface to move the cursor to highlight a given series identifier (e.g., a first series). If the first series is selected from the second level upon detecting release of the user's single finger from the touch input interface after the cursor highlights the first series (or if the first series is selected by keeping a cursor highlighting the series for a specified threshold period of time, such as 3 seconds), the media content playback system 107 displays a third set of options that includes a list of various episodes of the first series in a third level. Once the desired episode is selected in a similar manner, the media content playback system 107 automatically plays the selected episode in the lenses of the eyewear device 119.

In some cases, the user may not be interested in any of the episodes of the series identifier that are displayed. In this case, no particular episode is selected. The user may navigate back to the series identifiers to select a different series identifier by the media content playback system 107 detecting touch of the touch input interface by two fingers. Namely, in response to detecting that the user has added another finger and is now touching the touch input interface with two fingers, the media content playback system 107 removes from display the plurality of episode identifiers and redisplays the plurality of series identifiers. The media content playback system 107 can detect that the two fingers are dragged along the frame of the eyewear device 119 to navigate the cursor to select a different series identifier. For example, if the cursor is maintained positioned over the different series identifier for the threshold period of time (while the two fingers continue to touch the touch input interface without moving), the different series identifier that is highlighted is selected and the corresponding episodes of the highlighted series are displayed. A given episode can be selected in response to the media content playback system 107 detecting dragging of one or two fingers along the touch input interface and keeping the given episode highlighted for a threshold period of time or in response to detecting release of the finger or fingers from the touch input interface.

In some embodiments, the media content playback system 107 determines that a frame skipping operations from the first level are selected by the single finger. In such cases, the media content playback system 107 displays the second set of options in the second level that include one or more of a fast forward operation, seek, a rewind operation, a next episode operation, a previous episode operation, and so forth. The media content playback system 107 detects that a cursor has been moved by detecting dragging of the finger along the frame to highlight the seek or fast forward operation. In response to the seek or fast forward operation being highlighted for a specified threshold period of time (e.g., 3 seconds), the media content playback system 107 displays a slider to seek or fast forward through playback of content being displayed by the media content playback system 107 on the eyewear device 119. For example, the user can drag the single finger along the frame of the eyewear device 119 to move the slider to a desired position. As the slider moves the playback of the content seeks or fast forwards to a different playback position. When the finger is released, playback resumes from the selected playback position.

In some embodiments, the media content playback system 107 determines that a volume control from the first level are selected by the single finger. In such cases, the media content playback system 107 displays a slider to adjust volume of the media content being played by the eyewear device 119. For example, the media content playback system 107 can detect dragging of the single finger along the frame of the eyewear device 119. In response, the media content playback system 107 moves the slider to a desired position. As the slider moves the volume of the content changes. When the finger is detected as being released (no longer touching the touch input interface), playback resumes with the selected volume and the volume control slider is removed from the display.

The media content playback system 107 may receive a two-finger or multi-finger touch of a second option that is included in the second set of options. In some cases, the two-finger touch input may be received by the touch input interface of the eyewear device 119. In response, the media content playback system 107 navigates back to a previous level (e.g., navigates to the first level of the hierarchy of levels from the second level). In some cases, the first set of options of the first level replaces the display of the second set of options of the second level. In cases where the first and second sets of options are simultaneously displayed, the second set of options is removed from the display and navigation returns to the first set of options. Namely, any input received subsequent to the two-finger touch is associated with the first level of the hierarchy (e.g., the first set of options). In this way, a user can quickly and easily navigate up sequential levels of the hierarchy by providing a one-finger touch of respective options of the levels of the hierarchy that are presented and can quickly and easily navigate back down sequential levels of the hierarchy by providing a two-finger touch of a particular option or anywhere on the screen.

In some embodiments, the media content playback system 107 enables a user to quickly and easily navigate to a next level of a hierarchy of levels and select an option in the next level and then return back to the original level of the hierarchy without lifting the user's finger from the touch sensor. As an example, the first level of a hierarchy of levels is presented in which the first set of options is presented. The media content playback system 107 detects a one-finger touch and hold input over a given option of the first set of options. For example, the user may touch an area of the touch sensor corresponding to the given option with one finger (e.g., a user can touch the frame of the eyewear device 119 and drag the finger along the frame until a cursor identifies a desired option). The user may keep that finger positioned and placed on the touch sensor for a threshold period of time without moving the finger (e.g., for 2 seconds) to provide the touch and hold selection of a given option from the first level. For example, the media content playback system 107 can detect that the finger remains positioned touching a particular portion of the touch input interface for the threshold period of time. In response, the media content playback system 107 presents a second level of the hierarchy with a second set of options corresponding to the given option.

In some cases, the second set of options includes multiple individual options that can be selected or a slider that enables sequential adjustment of a parameter. As mentioned previously, the second set of options may be presented in replacement of the first set of options or adjacent to the first set of options. While the media content playback system 107 continues detecting contact with the user's finger after providing the touch and hold input, the media content playback system 107 can detect a slide (swipe) of the finger across the touch sensor (e.g., left and right). As the finger is detected to be sliding or swiping, different respective ones of the options displayed as part of the second set of options are indicated for selection or the slider is moved to new positions left/right corresponding to movement of the finger across the display or touch sensor. When the option of the second set of options is indicated for selection that is of interest to the user, the media content playback system 107 can detect that the finger has been released or lifted from the touch input interface to cause the indicated option to be selected and to automatically return to the first level of the hierarchy. In this way, the user can, with a combination of gestures using a single finger touch (touch and hold, slide, and removing or releasing the finger) navigate between levels of the hierarchy to select options of interest.

In some embodiments, the media content playback system 107 enables a user to quickly and easily navigate to a previous level of a hierarchy of levels and select an option in the previous level and then return back to the original level of the hierarchy without lifting the user's finger from the touch sensor. As an example, a second level of a hierarchy of levels is presented in which the second set of options is presented. The media content playback system 107 detects a two-finger touch and hold input over a given option of the second set of options. For example, the user may touch an area of the touch sensor corresponding to the given option with two fingers and may keep those fingers positioned and placed on the touch sensor for a threshold period of time without moving the fingers (e.g., for 2 seconds) to provide the two-finger touch and hold input. In response, the media content playback system 107 returns to presenting and enabling navigation through the first level of the hierarchy with the first set of options. In some cases, the first set of options includes multiple individual options that can be selected or a slider that enables sequential adjustment of a parameter. As mentioned previously, the first set of options may be presented in replacement of the second set of options or adjacent to the second set of options. While the media content playback system 107 continues detecting two fingers touching the touch input interface (e.g., without lifting the user's two-fingers) after determining the two-finger touch and hold input, the media content playback system 107 can detect that the fingers are sliding or swiping across the display or touch sensor (e.g., left and right). As the user slides (swipes) the two-fingers, different respective ones of the options displayed as part of the first set of options are indicated for selection or the slider is moved to new positions left/right corresponding to movement of the two fingers across the display or touch sensor. When the option of the first set of options is indicated for selection that is of interest to the user, the media content playback system 107 can detect release of the two fingers to cause the indicated option to be selected.

A messaging client 104 is able to communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

Figure 3:
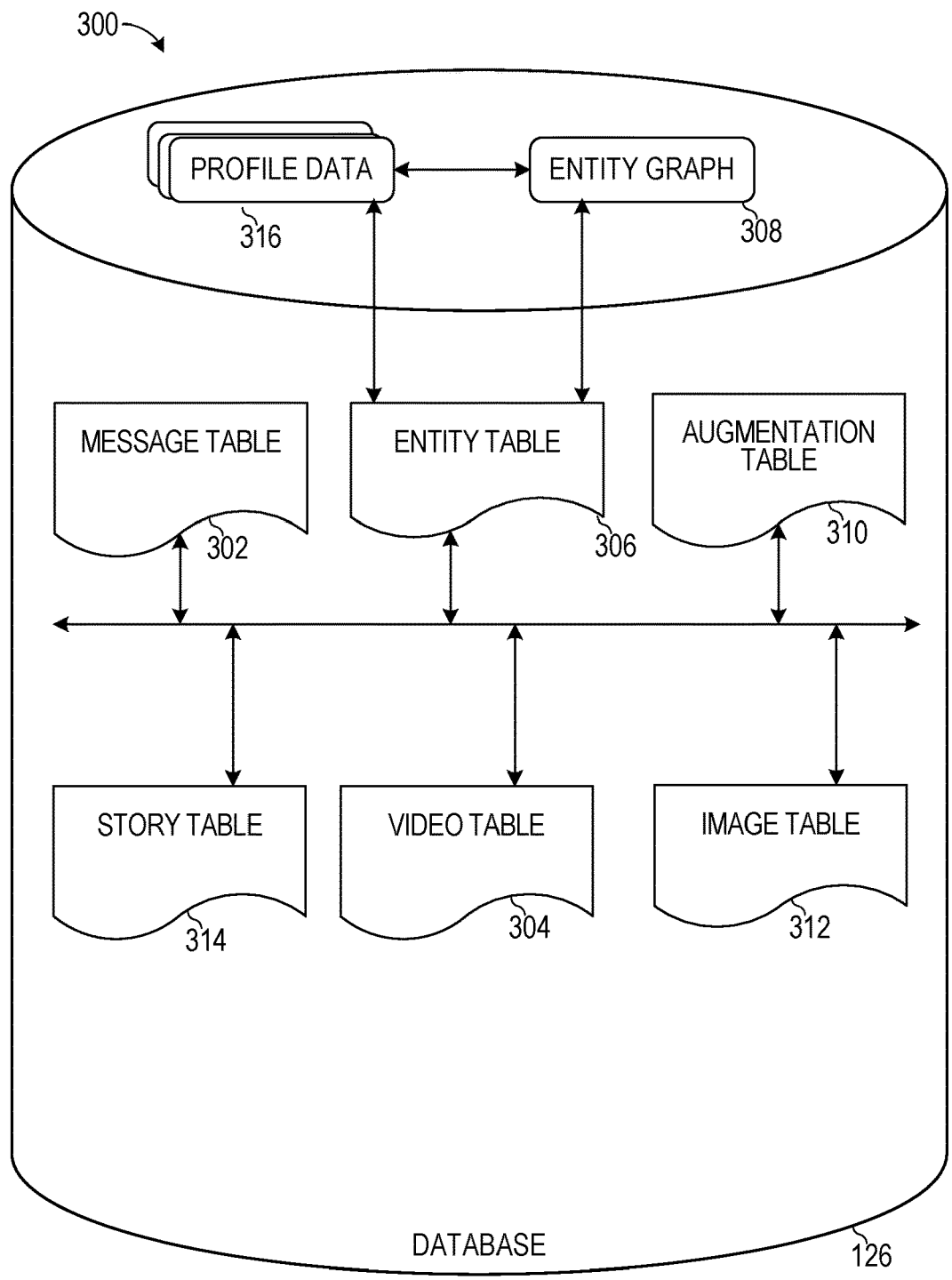
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
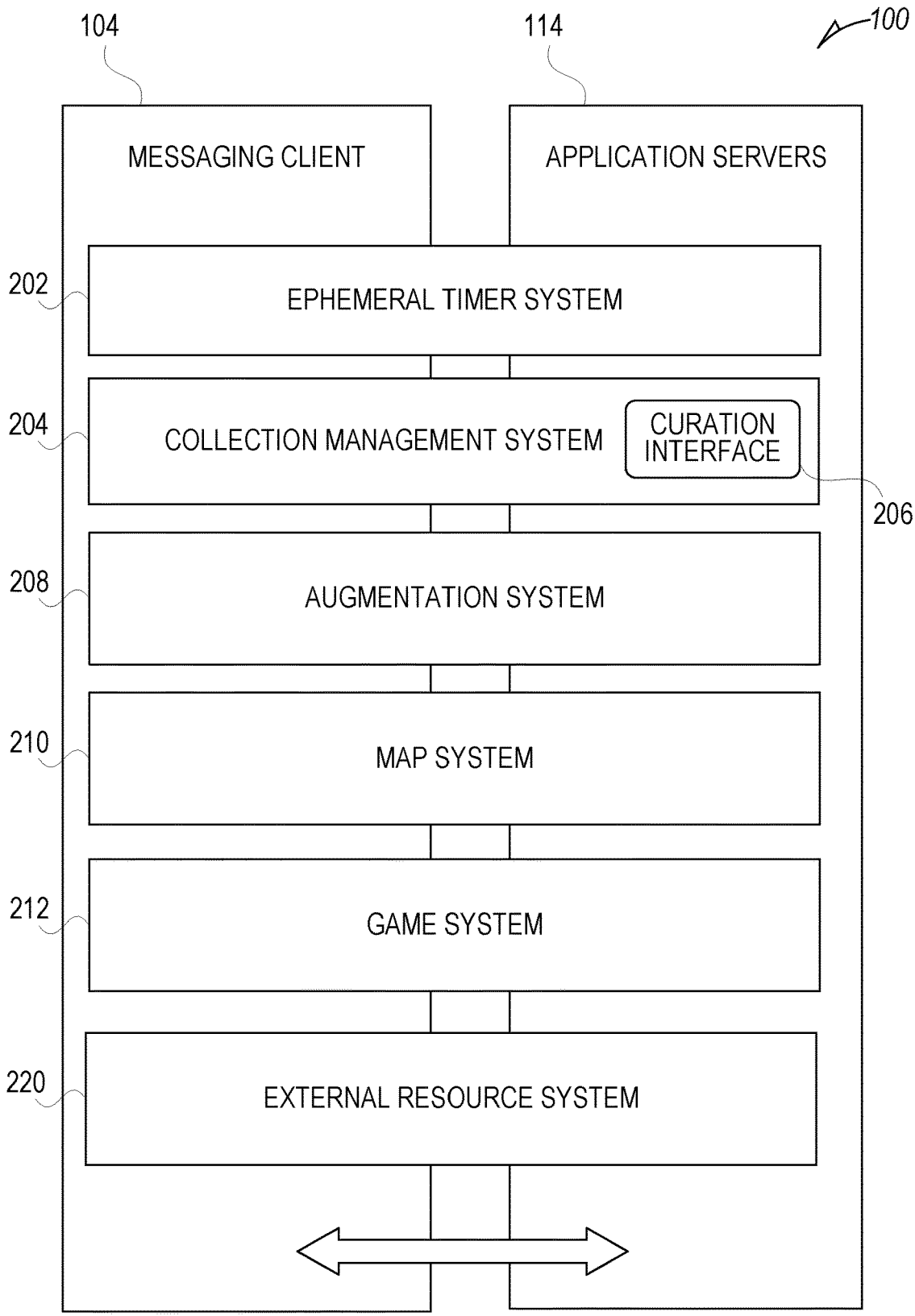
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
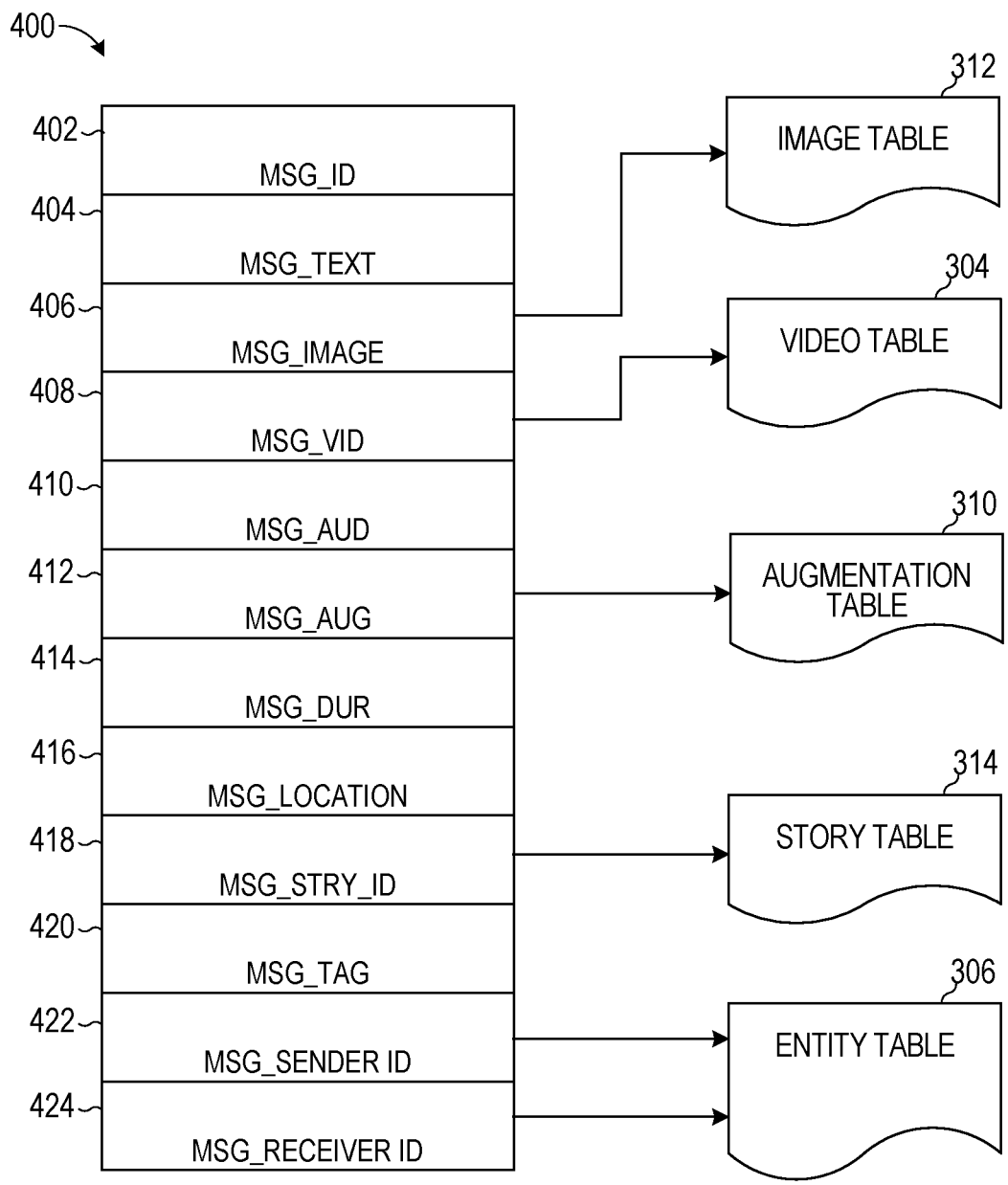
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements)

that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
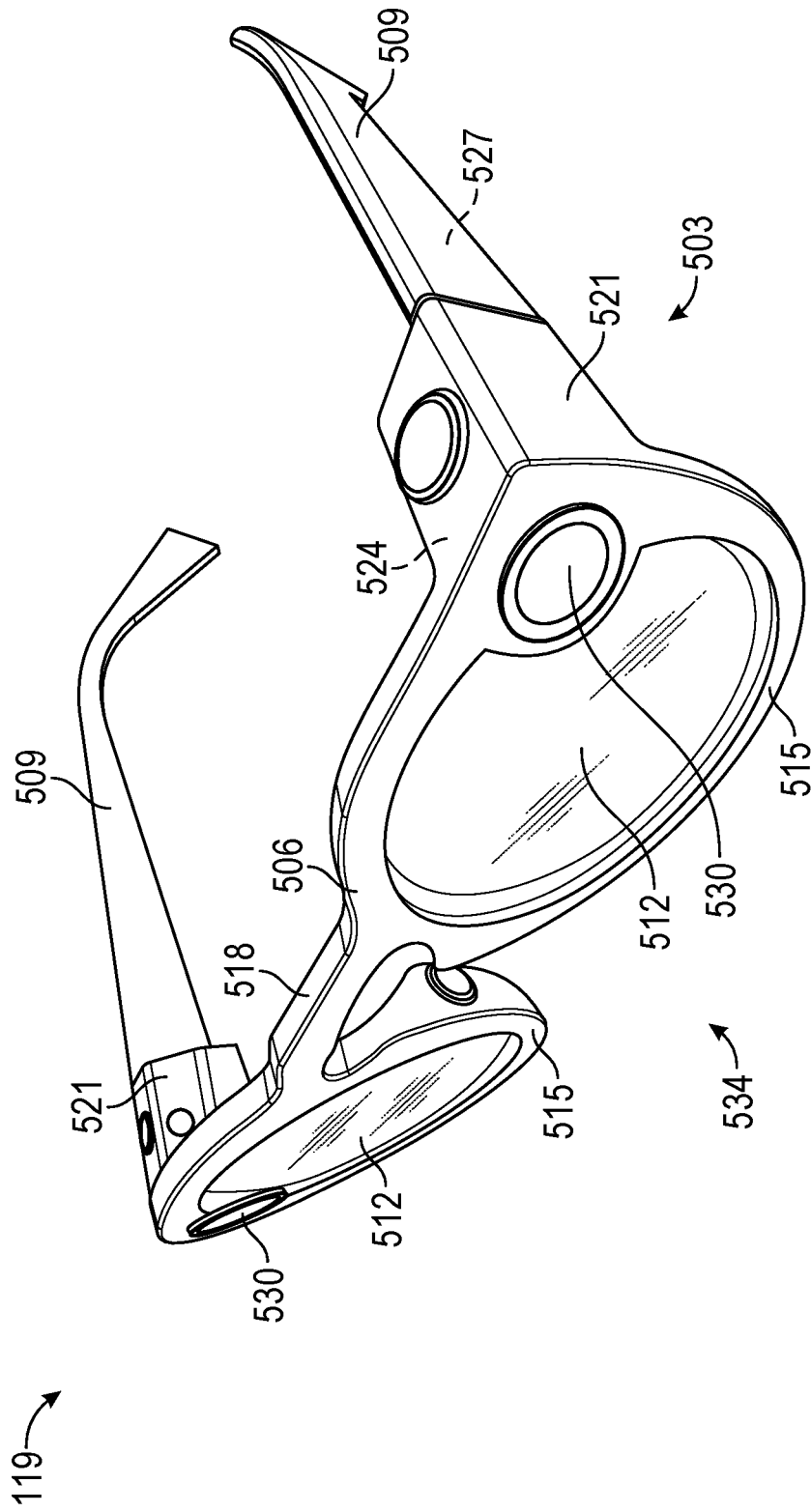
FIG. 5 is a perspective view of an eyewear device according to an example embodiment.

FIG. 5 shows a front perspective view of an eyewear device 119 in the form of a pair of smart glasses that include a media content playback system 107 according to one example embodiment. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy. The frame 506 can include a touch input interface that is configured to receive touch input from a user (e.g., one finger touch, two finger touch, or combination thereof together with dragging the finger(s) along the frame 506).

The eyewear device 119 includes a pair of optical elements in the form of a pair of lenses 512 held by corresponding optical element holders in the form of a pair of rims 515 forming part of the frame 506. The rims 515 are connected by a bridge 518. In other embodiments, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other embodiments, the temples 509 can be coupled to the frame 506 by any suitable means, or can be rigidly or fixedly secured to the frame 506 so as to be integral therewith.

Each of the temples 509 that includes a front portion of that is coupled to the frame 506 and any suitable rear portion for coupling to the ear of the user, such as the curves or cute piece illustrated in the example embodiment of FIG. 5. In some embodiments, the frame 506 is formed of a single piece of material, so as to have a unitary or monolithic construction. In some embodiments, the whole of the body 503 (including both the frame 506 and the temples 509) can be of the unitary or monolithic construction.

The eyewear device 119 has onboard electronics components including a computing device, such as a computer 524, or low power processor, which can in different embodiments be of any suitable type so as to be carried by the body 503. In some embodiments, the computer 524 is at least partially housed in one or both of the temples 509. In the present embodiment, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some embodiments, a display processor. Various embodiments may include these elements in different configurations or integrated together in different ways.

The computer 524 additionally includes a battery 527 or other suitable portable power supply. In one embodiment, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example comprising a camera 530 mounted in one of the end pieces 521 and facing forwards so as to be aligned more or less with the direction of view of a wearer of the eyewear device 119. The camera 530 is configured to capture digital images (also referred to herein as digital photographs or pictures) as well as digital video content. Operation of the camera 530 is controlled by a camera controller provided by the computer 524, image data representative of images or video captured by the camera 530 being temporarily stored on a memory forming part of the computer 524. In some embodiments, the eyewear device 119 can have a pair of cameras 530, e.g. housed by the respective end pieces 521.

The onboard computer 524 and the lenses 512 are configured together to provide a media content playback system 107 that automatically and selectively allows a user to navigate through a menu hierarchy to select between various media playback options. Specifically, the lenses 512 can display virtual content, such as a video or audio player together with one or more options related to playback of the video and/or audio. This makes it appear to the user that the virtual content is integrated within a real-world environment that the user views through the lenses 512. In some embodiments, the virtual content is received from the client device 102. In some embodiments, the virtual content is received directly from the application servers 114.

The eyewear device 119 includes an accelerometer and a touch interface and a voice command system. The touch interface can be integrated within a portion of the frame 506 (e.g., within one or both of lateral end pieces 521). Based on input received by the eyewear device 119 from the accelerometer and a touch interface and the voice command system, the eyewear device 119 can control user interaction with the virtual content. In one example, the user interaction can control playback of content that is presented on the lenses 512. In another example, the user interaction can navigate through a playlist or music or video library. In another example, the user interaction can navigate through a conversation the user is involved in, such as by scrolling through various chat bubbles and selecting individual chat bubbles to respond to generate messages to transmit to participants of the conversation.

The touch interface is configured to determine whether one finger or two fingers are touching the eyewear device 119. In response to detecting that a single finger has touched the eyewear device 119, the media content playback system 107 displays a cursor over the playback control options (options that include volume control, playback position control, series control, and so forth). The user can slide the finger along the frame 506 to move the position of the cursor to highlight different options of the playback control menu. When the cursor is positioned over a given option for a threshold period of time (e.g., 3 seconds) and while the media content playback system 107 detects continuous contact between the finger and the touch interface (e.g., without the user releasing the finger from the frame 506), the media content playback system 107 selects the option and accesses a level of the playback control menu associated with the given option. For example, the given option may be a volume control option. In such cases, the media content playback system 107 displays a slider for changing the volume of the content being played back when the cursor is positioned over the volume control option for a threshold period of time. The media content playback system 107 detects the finger dragging along the frame 506 to move the slider to change the volume. When the media content playback system 107 detects release of the finger, the volume is set by the last position of the slider and the slider is removed from the display.

As another example, the given option may be a series control option. In such cases, the media content playback system 107 displays a set of series identifiers when the series control option is highlighted for a threshold period of time (e.g., 3 seconds). The media content playback system 107 detects drag of the finger along the frame 506 to move a cursor to highlight different series identifiers. When a series identifier is highlighted by the cursor for a threshold period of time and without the media content playback system 107 detecting release of the finger from the frame 506, a set of episodes associated with the highlighted series identifier are presented. The media content playback system 107 detects that the finger is dragged along the frame 506 to move a cursor to highlight different episode identifiers. When an episode identifier is highlighted by the cursor for a threshold period of time or when the media content playback system 107 detects the release of the finger from the frame 506 after the cursor is moved over a desired episode identifier, the episode associated with the episode identifier is retrieved and played back in the video player of the eyewear device 119 for display in the lenses.

In some cases, the user may not be interested in any of the episodes that are displayed by the episode identifiers. Because releasing the finger causes the media content playback system 107 to playback a current episode being highlighted, the media content playback system 107 can detect that the user adds a finger so that two fingers are detected as touching the frame 506. This instructs the media content playback system 107 to navigate back to a previous level of the hierarchy. For example, the media content playback system 107 can detect that a second finger has made contact with the touch interface of the eyewear device 119. In response, the media content playback system 107 redisplays the series identifiers. The eyewear device 119 can continue to detect that two fingers are touching the frame 506 and that the two fingers are being dragged along the frame 506. In response the media content playback system 107 moves the cursor to highlight a different series identifier. When that different series identifier is highlighted for a threshold period of time, the media content playback system 107 displays episode identifiers associated with the different series identifier for the user to enable the user to navigate through and select in response to the eyewear device 119 detecting movement of the two fingers which are in contact with the touch input interface. Namely, when the media content playback system 107 detects that the two fingers have been released and are no longer in contact physically with the touch input interface after being used to move the cursor to highlight a given episode identifier, the corresponding episode is retrieved and displayed on the lenses of the eyewear device 119.

In some embodiments, the eyewear device 119 detects that the finger is continuously in contact with and touching the frame 506 throughout selection and navigation through the playback control menu. The finger is continuously in contact with the frame 506 while different levels of the playback control menu is navigated. For example, the eyewear device 119 detects that the finger is not released from the frame 506 from initial contact while the user navigates through volume control and/or series or episode selection. In one case, after adjusting the volume using the single finger, the eyewear device 119 detects that the user does not release the finger and allows navigation to the series control option. For example, after the volume slider is presented, the user can drag the finger to a desired volume. Then, the user can add a second finger to cause the initial menu of the playback menu control to be displayed that includes the volume control and the series control options. The user can now, with the two fingers, drag the cursor to select the series control option by maintaining the cursor at the series control option position for a threshold period of time. In response, the series identifiers are presented and can be navigated through by dragging the two fingers along the frame 506 until a series identifier of interest is found.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some embodiments, the client device 102 communicates with the eyewear device 119 using the first protocol to exchange images or videos or virtual content between the messaging client 104 and the eyewear device 119.

Media Content Playback System

Figure 6:
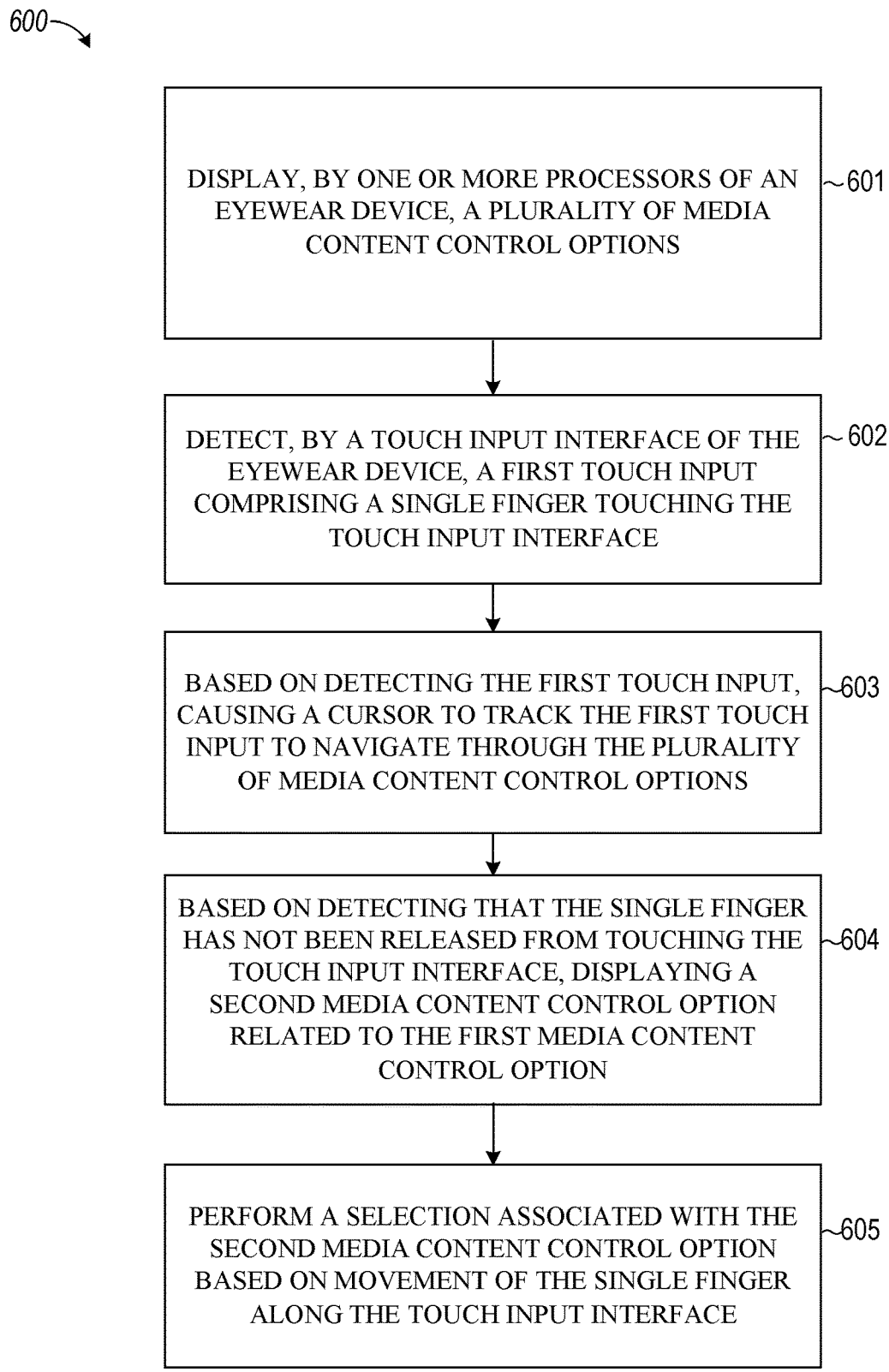
FIG. 6 is a flowchart showing example operations of the media content control interface system, according to an example embodiment.

FIG. 6 is a flowchart illustrating example operations of the media content playback system 107 in performing a process 600, according to example embodiments. The process 600 may be embodied in computer-readable instructions for execution by one or more processors such that the operations of the process 600 may be performed in part or in whole by the functional components of the notification management system 107; accordingly, the process 600 is described below by way of example with reference thereto. However, in other embodiments, at least some of the operations of the process 600 may be deployed on various other hardware configurations. The process 600 is therefore not intended to be limited to the media content playback system 107 and can be implemented in whole, or in part, by any other component. Some or all of the operations of process 600 can be in parallel, out of order, or entirely omitted.

At operation 601, the media content playback system 107 displays, by one or more processors of the eyewear device 119, a plurality of media content control options, as explained above At operation 602, the media content playback system 107 detects, by a touch input interface of the eyewear device, a first touch input comprising a single finger touching the touch input interface, as also explained above. At operation 603, in response to the detection of the first touch input, the media content playback system 107 causes navigation of a cursor through the plurality of media content control options that tracks the first touch input to allow selection of a first media content control option of the plurality of media content control options.

At operation 604, the media content playback system 107 detects that the single finger is continuously touching the touch input interface indicating a selection of the first media content control option. In response to the detection, the content playback system 107 displays a second media content control option related to the first media content control option.

At operation 605, the media content playback system 107 detects a selection associated with the second media content control option based on detecting movement of the single finger along the touch input interface. In response to the detection, the media content playback system 107 performs a media content playback control operation corresponding to the second media content control option (e.g., the media content playback system 107 changes a play position or adjusts volume of content being played back).

Figure 7:
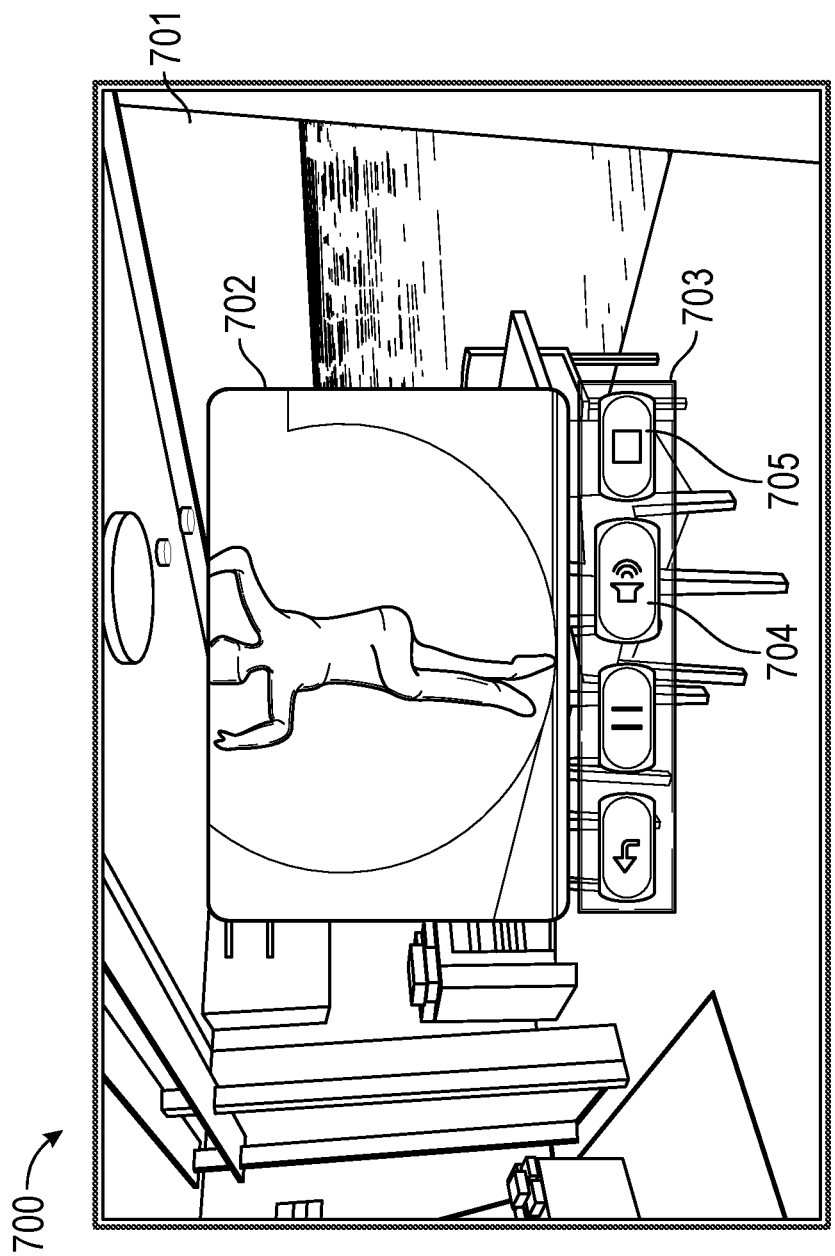
FIGS. 7-9 are illustrative screens of a graphical user interface for the media content control interface system, according to example embodiments.
Figure 8:
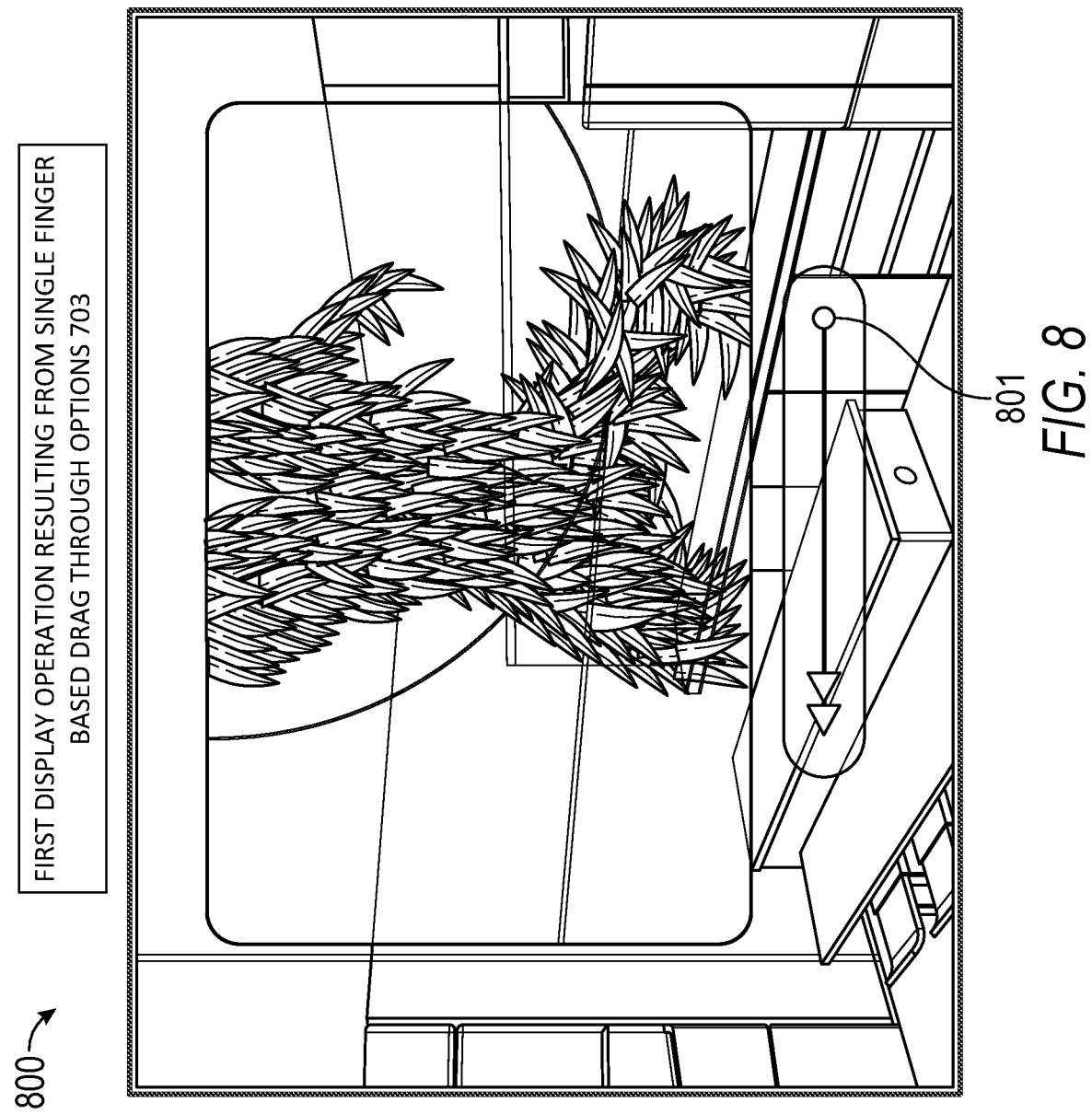
Figure 9:
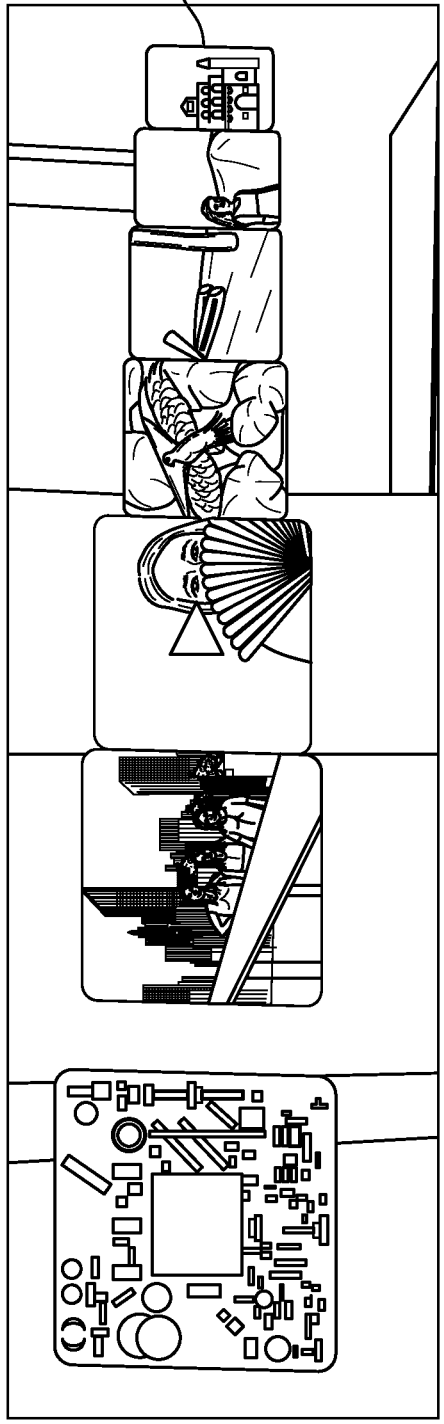

FIGS. 7-9 are illustrative screens of a graphical user interface of the media content playback system 107 according to example embodiments. The screens shown in FIGS. 7-9 may be provided by the messaging client 104 of one or more client devices 102, other applications implemented on one or more client devices 102, or the eyewear device 119.

FIG. 7 shows a user interface 700 of the media content playback system 107. The user interface 700 includes a real-world environment 701 that the user sees through the lenses of the eyewear device 119. A media content player 702 is presented which includes one or more virtual objects. For example, the media content player 702 includes a video playback region option in which video and/or audio of content is presented to the user. The media content player includes a plurality of options 703 that include playback control options (e.g., volume control, series control, playback position control, and so forth).

In one embodiment, the user touches the eyewear device 119 at a touch input interface, such as on a frame 506 of the eyewear device 119. For example, the user can place a single finger on the touch input interface. In response, to detecting the single finger on the touch input interface, the media content playback system 107 presents a cursor within the plurality of options 703. The media content playback system 107 detects that the finger has been dragged along the touch input interface and in response the cursor is moved according to the direction of movement of the finger to highlight a desired option. As an example, the user can move the cursor to highlight a volume option 704. If media content playback system 107 determines that the cursor has remained positioned over the volume option 704 for a threshold period of time (e.g., 3 seconds), the media content playback system 107 presents a user interface 800 (FIG. 8) to allow the user to change or control the volume.

Specifically, as shown in user interface 800, the video playback region is expanded and a slider 804 is presented. The user can move the finger along the touch input interface to change the position of the slider to increase or decrease the volume of the content being played back. Once the desired volume is reached, the user can release the finger from the touch input interface. In response, the media content playback system 107 returns the user back to the user interface 700 in which the plurality of options 703 are presented. In some cases, while the user interface 800 is presented, the user may desire to return back to the interface 700 in which the plurality of options 703 are presented. In this case, after setting the desired volume by maintaining the slider at a given position for a threshold period of time, the user can add a second finger to the touch input interface. At this point, the touch input interface detects two fingers touching the touch input interface. In response, the media content playback system 107 returns the user back to the interface 700 in which the plurality of options 703 are presented after setting the volume using the single finger. The user can drag the two fingers along the touch input interface to move the cursor to select a different one of the plurality of options 703. For example, the user can move the cursor to highlight a series control option 705. Without the user releasing the two fingers from the touch input interface, the media content playback system 107 can determine that the cursor has remained positioned over the series control option 705 for a threshold period of time (e.g., 3 seconds). If so, the media content playback system 107 presents user interface 900 (FIG. 9) to allow the user to select a series and episode using a two finger touch.

As another example, the user can touch the touch input interface with a single finger and drag a cursor to highlight the series control option 705. In response to detecting that the single finger has made contact with the touch interface of the eyewear device 119 and has been dragged along the touch interface, the media content playback system 107 navigates the cursor to a desired position. The media content playback system 107 can determine that the cursor has remained positioned over the series control option 705 for a threshold period of time (e.g., 3 seconds). If so, the media content playback system 107 presents a user interface 900 (FIG. 9) to allow the user to select a series identifier from a plurality of series identifiers.

Specifically, as shown in user interface 900, the video playback region is removed and a plurality of series identifiers 901 are presented. The media content playback system 107 determines that the finger making contact with the touch interface has been moved along the touch input interface to change a position of a cursor to select a given series identifier from the series identifiers 901. As another example, if the user interface 900 was reached based on a two finger touch, the media content playback system 107 detects that two fingers are being moved along the touch input interface to change a position of a cursor to select a given series identifier from the series identifiers 901. Once the desired series identifier is selected (e.g., by maintaining the cursor positioned over the desired series identifier for a threshold period of time), the media content playback system 107 presents a plurality of episode identifiers to allow the user to select an episode identifier of the desired series. The media content playback system 107 can detect movement of the finger (or two fingers depending on how the menu level is reached) along the touch input interface to change a position of a cursor to select a given episode identifier. The media content playback system 107 can detect that the finger(s) have been released from the touch input interface when a desired episode identifier is highlighted. In response, the media content playback system 107 accesses the episode corresponding to the highlighted episode identifier, plays back the episode in the lenses of the eyewear device and returns the user back to the user interface 700 in which the plurality of options 703 are presented.

In some cases, while the user interface 900 is presented in response to a single finger touch, the user may desire to not select a series identifier and return back to the interface 700 in which the plurality of options 703 are presented. In this case, the media content playback system 107 detects that a second finger has made contact with the touch input interface. At this point, the touch input interface detects two fingers touching the touch input interface. In response, the media content playback system 107 returns the user back to the interface 700 in which the plurality of options 703 are presented without selecting any particular series identifier. The media content playback system 107 detects that the two fingers have been dragged along the touch input interface to move the cursor to select a different one of the plurality of options 703. For example, the user can move the cursor to highlight a seek or play position option. Prior to detecting that the fingers have been released from the touch input interface, the media content playback system 107 can determine that the cursor has remained positioned over the seek or play position option for a threshold period of time (e.g., 3 seconds). If so, the media content playback system 107 presents a user interface similar to that shown in FIG. 8 to allow the user to change the playback position.

Specifically, the media content playback system 107 can detect movement of two fingers along the touch input interface. In response, the media content playback system 107 changes the position of the slider to advance or rewind the play position of the content being played back. Once the desired play position is reached, the media content playback system 107 can detect that the two fingers have been releases from the touch input interface. In response, the media content playback system 107 returns the user back to the user interface 700 in which the plurality of options 703 are presented and plays back the content from the desired play position.

Machine Architecture

Figure 10:
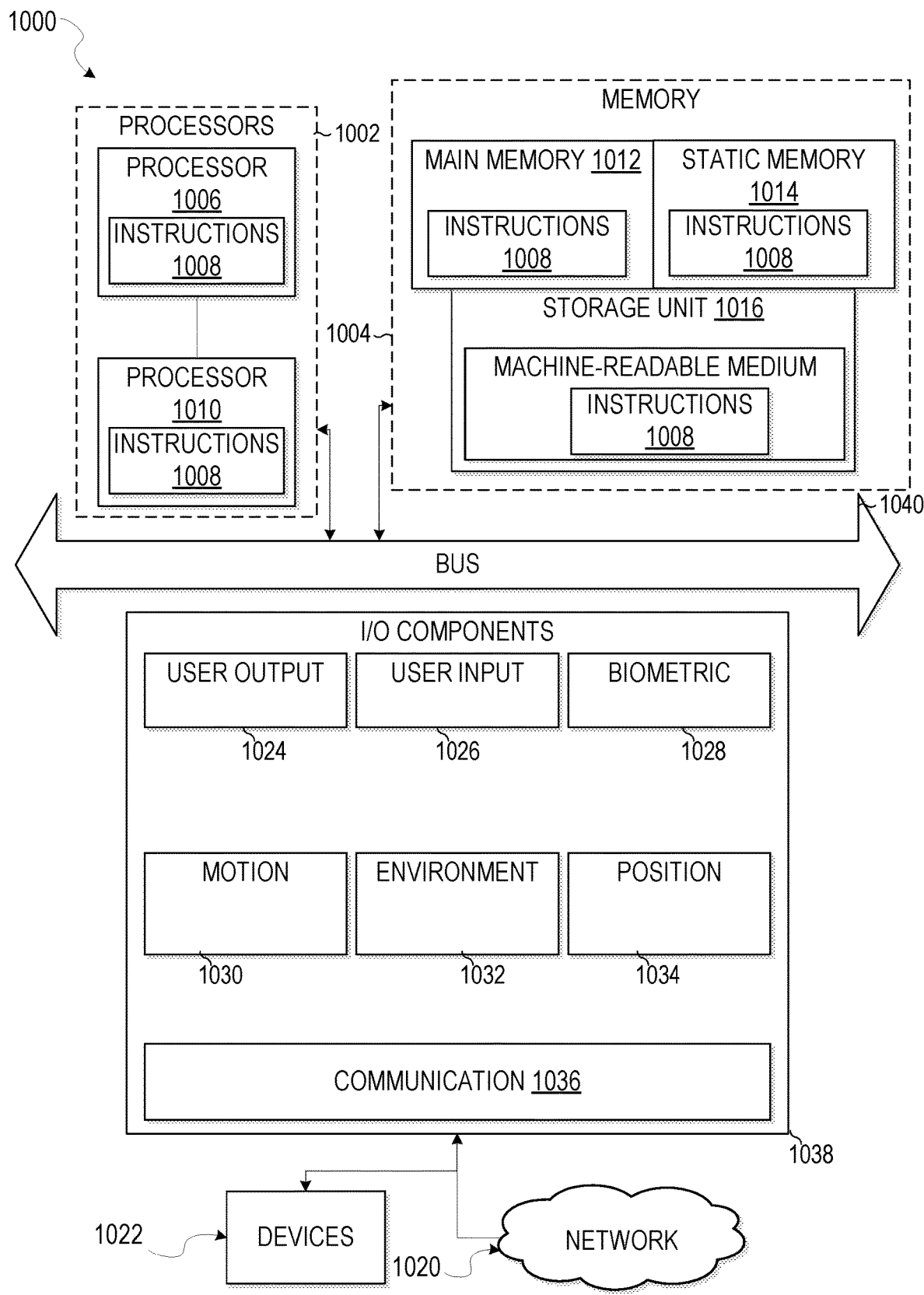
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 1n various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
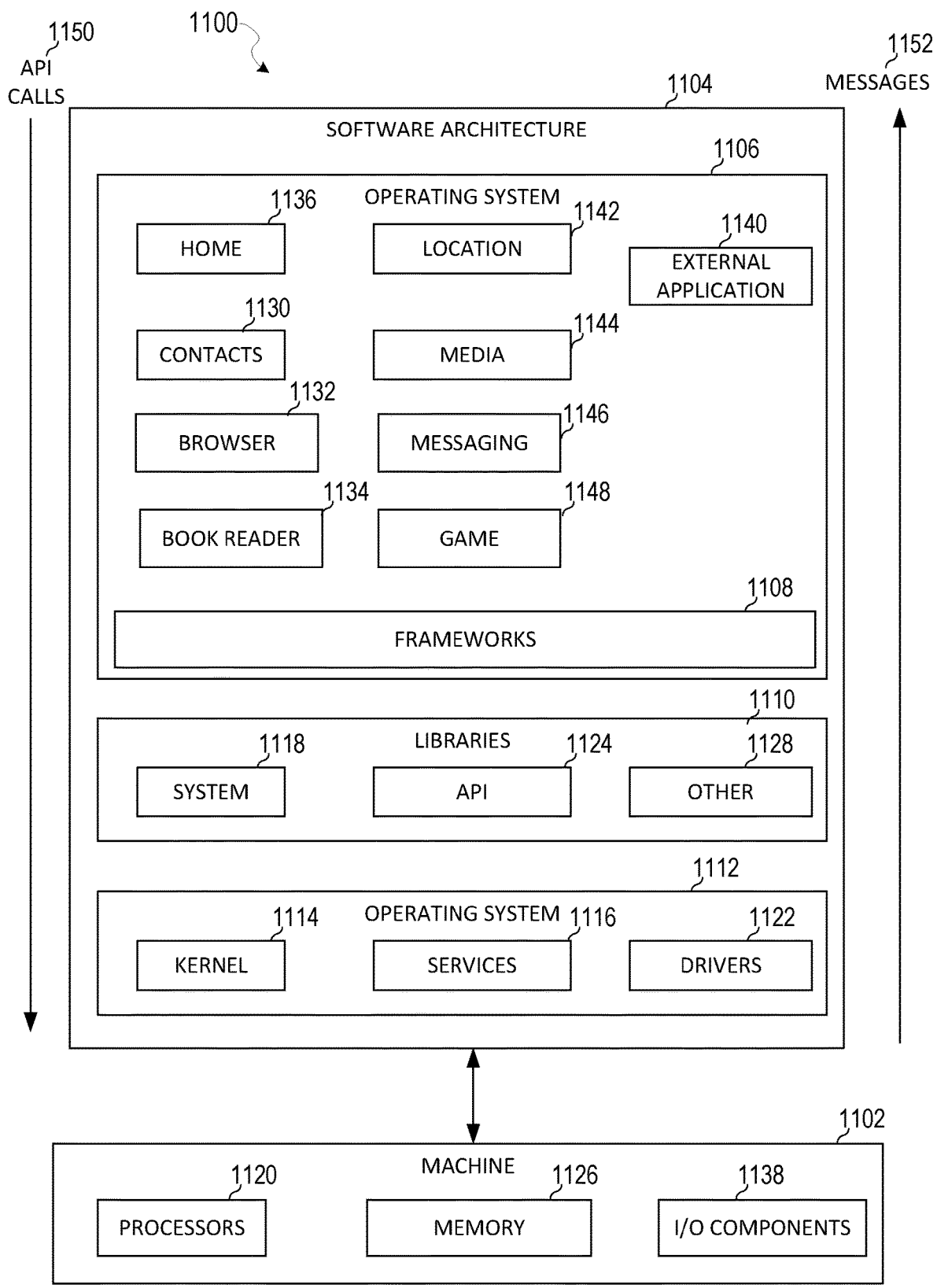
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1140 can invoke the API calls 1150 provided by the operating system 1112 to facilitate functionality described herein.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

What is claimed is:

1. A method comprising:
concurrently displaying, by one or more processors of an eyewear device, as overlaid on a real-world environment being viewed through lenses of the eyewear device, a plurality of media content control options and a video player that presents a video, one or more of the plurality of media content control options corresponding to adjusting a play position of the video presented by the video player;

detecting, by a touch input interface of the eyewear device, a first touch input comprising a single finger touching the touch input interface;

based on detecting the first touch input comprising a press and hold operation, triggering display of a cursor and causing the cursor to track the first touch input to navigate through the plurality of media content control options to a first media content control option;

after the single finger is initially detected by the touch input interface and while the single finger continues to be detected by the touch input interface, determining that an additional finger has been added to touch the touch input interface together with the single finger such that the touch input interface is receiving touch input by two fingers;

and performing a first display operation comprising a selection associated with a second media content control option related to the first media content control option in response to determining that the additional finger has been added to touch the touch input interface together with the single finger after detecting the first touch input comprising the single finger, such that a first level of a set of menu options is navigated using one-finger navigation and a second level of the set of menu options is navigated using two-finger navigation.

2. The method of claim 1, further comprising:
based on detecting that the single finger has not been released from touching the touch input interface, displaying a second media content control option related to the first media content control option;
and performing a second display operation comprising a selection associated with the second media content control option based on movement of the single finger along the touch input interface.

3. The method of claim 1, further comprising:
in response to detection of the single finger continuing to touch the touch input interface, determining that the first media content control option has been highlighted by the cursor for a threshold period of time;
and in response to determining that the first media content control option has been highlighted by the cursor for the threshold period of time, selecting the first media content control option.

4. The method of claim 1, wherein the touch input interface is integrated into a frame of the eyewear device.

5. The method of claim 1, wherein the first media content control option comprises a volume adjustment option, and wherein displaying the second media content control option comprises:
displaying a slider for adjusting volume of media content being played back on the eyewear device;
and detecting movement of the single finger along the touch input interface to change a position of the slider to adjust the volume.

6. The method of claim 1, further comprising:
removing the second media content control option from the display in response to detecting a release of the single finger from the touch input interface;
and redisplaying the plurality of media content control options in response to detecting the release of the single finger from the touch input interface.

7. The method of claim 1, wherein the first media content control option comprises a seek option, and wherein displaying the second media content control option comprises:
displaying a slider for adjusting a play position of media content being played back on the eyewear device;

and detecting movement of the single finger along the touch input interface to change a position of the slider to adjust the play position.

8. The method of claim 1, wherein the first media content control option comprises a series selection option, and wherein displaying the second media content control option comprises:
displaying a plurality of series identifiers;
and detecting movement of the single finger along the touch input interface to move the cursor to highlight a given series identifier of the plurality of series identifiers.

9. The method of claim 8, further comprising:
displaying a plurality of episode identifiers in response to determining that the cursor has highlighted the given series identifier for a threshold period of time;
and moving the cursor to highlight a given episode identifier of the plurality of episode identifiers based on detected movement of the single finger along the touch input interface.

10. The method of claim 9, further comprising playing back an episode of the series corresponding to the given episode identifier in response to determining that the single finger has been released from the touch input interface.

11. The method of claim 10, further comprising:
detecting movement of two fingers along the touch input interface and causing the cursor to move to highlight a series identifier of a plurality of series identifiers based on the detected movement of the two fingers along the touch input.

12. The method of claim 1, further comprising:
selecting between navigation between a first series of options and a second series of options based on whether the single finger or the two fingers are dragged along the touch input interface;
detecting continuous contact between the single finger and a frame of the eyewear device while different levels of a displayed playback control menu are navigated including a volume control option and a series selection option;
determining that the single finger has been dragged to highlight the volume control option;
determining that the volume control option has been highlighted for a threshold period of time;
in response to determining that the volume control option has been highlighted for the threshold period of time, replacing display of the playback control menu with a volume slider;
adjusting volume using the single finger corresponding to a volume control level of the playback control menu by dragging the single finger to a desired volume along the volume slider;
after adjusting the volume using the single finger and the volume slider, detecting the additional finger on the frame of the eyewear device;
and in response to detecting the additional finger on the frame of the eyewear device, after adjusting the volume by dragging the single finger along the volume slider, re-displaying the playback control menu including the volume control option and a series selection option in place of the volume slider.

13. The method of claim 1, wherein a playback control menu which was initially navigated using the single finger is now navigated through by dragging the two fingers along a frame of the eyewear device.

14. An eyewear device comprising:
a touch input interface;
a storage device comprising instructions;
and at least one processor configured to execute the instructions to perform operations comprising:
concurrently displaying as overlaid on a real-world environment being viewed through lenses of the eyewear device, a plurality of media content control options and a video player that presents a video, one or more of the plurality of media content control options corresponding to adjusting a play position of the video presented by the video player;
detecting, by a touch input interface of the eyewear device, a first touch input comprising a single finger touching the touch input interface;
based on detecting the first touch input comprising a press and hold operation, triggering display of a cursor and causing the cursor to track the first touch input to navigate through the plurality of media content control options to a first media content control option;
after the single finger is initially detected by the touch input interface and while the single finger continues to be detected by the touch input interface, determining that an additional finger has been added to touch the touch input interface together with the single finger such that the touch input interface is receiving touch input by two fingers;
and performing a first display operation comprising a selection associated with a second media content control option related to the first media content control option in response to determining that the additional finger has been added to touch the touch input interface together with the single finger after detecting the first touch input comprising the single finger, such that a first level of a set of menu options is navigated using one-finger navigation and a second level of the set of menu options is navigated using two-finger navigation.

15. The eyewear device of claim 14, the operations further comprising:
based on detecting that the single finger has not been released from touching the touch input interface, displaying a second media content control option related to the first media content control option;
and performing a second display operation comprising a selection associated with the second media content control option based on movement of the single finger along the touch input interface.

16. The eyewear device of claim 14, wherein the operations further comprise:
in response to detection of the single finger continuing to touch the touch input interface, determining that the first media content control option has been highlighted by the cursor for a threshold period of time;
and in response to determining that the first media content control option has been highlighted by the cursor for the threshold period of time, selecting the first media content control option.

17. The eyewear device of claim 14, wherein the first media content control option comprises a seek option, and wherein displaying the second media content control option comprises:
displaying a slider for adjusting a play position of media content being played back on the eyewear device;
and detecting movement of the single finger along the touch input interface to change a position of the slider to adjust the play position.

18. A non-transitory machine-readable storage medium comprising instructions that, when executed by one or more processors of an eyewear device, cause the eyewear device to perform operations comprising:

concurrently displaying as overlaid on a real-world environment being viewed through lenses of the eyewear device, a plurality of media content control options and a video player that presents a video, one or more of the plurality of media content control options corresponding to adjusting a play position of the video presented by the video player;

detecting, by a touch input interface of the eyewear device, a first touch input comprising a single finger touching the touch input interface;

based on detecting the first touch input comprising a press and hold operation, triggering display of a cursor and causing the cursor to track the first touch input to navigate through the plurality of media content control options to a first media content control option;

after the single finger is initially detected by the touch input interface and while the single finger continues to be detected by the touch input interface, determining that an additional finger has been added to touch the touch input interface together with the single finger such that the touch input interface is receiving touch input by two fingers;

and performing a first display operation comprising a selection associated with a second media content control option related to the first media content control option in response to determining that the additional finger has been added to touch the touch input interface together with the single finger after detecting the first touch input comprising the single finger, such that a first level of a set of menu options is navigated using one-finger navigation and a second level of the set of menu options is navigated using two-finger navigation.

19. The non-transitory machine-readable storage medium of claim 18, the operations further comprising:

based on detecting that the single finger has not been released from touching the touch input interface, displaying a second media content control option related to the first media content control option;

and performing a second display operation comprising a selection associated with the second media content control option based on movement of the single finger along the touch input interface.

20. The non-transitory machine-readable storage medium of claim 18, wherein the operations further comprise:

in response to detection of the single finger continuing to touch the touch input interface, determining that the first media content control option has been highlighted by the cursor for a threshold period of time;

and in response to determining that the first media content control option has been highlighted by the cursor for the threshold period of time, selecting the first media content control option.

* * * * *